US009000605B2

(12) United States Patent
Glass

(10) Patent No.: US 9,000,605 B2
(45) Date of Patent: Apr. 7, 2015

(54) LIGHTER-THAN-AIR CRAFT FOR ENERGY-PRODUCING TURBINES

(75) Inventor: Benjamin W. Glass, Somerville, MA (US)

(73) Assignee: Altaeros Energies, Inc., Boston, MA (US)

( * ) Notice: Subject to any disclaimer, the term of this patent is extended or adjusted under 35 U.S.C. 154(b) by 0 days.

(21) Appl. No.: 13/565,916

(22) Filed: Aug. 3, 2012

(65) Prior Publication Data

US 2012/0319407 A1  Dec. 20, 2012

Related U.S. Application Data

(63) Continuation-in-part of application No. 12/579,839, filed on Oct. 15, 2009, now Pat. No. 8,253,265.

(60) Provisional application No. 61/105,509, filed on Oct. 15, 2008.

(51) Int. Cl.
*F03D 9/00* (2006.01)
*H02P 9/04* (2006.01)
*F03D 1/04* (2006.01)
*F03D 1/02* (2006.01)
*F03D 11/04* (2006.01)
*B64B 1/06* (2006.01)

(52) U.S. Cl.
CPC .. *F03D 1/04* (2013.01); *F03D 1/02* (2013.01); *F03D 11/04* (2013.01); *F05B 2240/922* (2013.01); *F05B 2240/133* (2013.01); *F05B 2240/917* (2013.01); *Y02E 10/728* (2013.01)

(58) Field of Classification Search
USPC ........................................ 290/44, 55; 244/30
See application file for complete search history.

(56) References Cited

U.S. PATENT DOCUMENTS

| 1,876,595 | A | * | 9/1932 | Beldimano | 415/60 |
|---|---|---|---|---|---|
| 2,218,867 | A | * | 10/1940 | Beldimano | 416/121 |
| 2,431,111 | A | * | 11/1947 | Du Brie | 416/130 |
| 4,165,468 | A | | 8/1979 | Fry et al. | 290/55 |
| 4,166,596 | A | | 9/1979 | Mouton, Jr. et al. | 244/30 |
| 4,207,026 | A | | 6/1980 | Kushto | 416/84 |
| 4,309,006 | A | | 1/1982 | Biscomb | 244/33 |
| 4,350,896 | A | * | 9/1982 | Benoit | 290/55 |
| 4,350,897 | A | | 9/1982 | Benoit | 290/55 |

(Continued)

FOREIGN PATENT DOCUMENTS

| EP | 0045202 | 2/1982 |
|---|---|---|
| EP | 0935068 | 8/1999 |

*Primary Examiner* — Pedro J Cuevas
(74) *Attorney, Agent, or Firm* — Loginov & Associates, PLLC; William A. Loginov

(57) ABSTRACT

A wind-based power generating system provides a wind energy converter for converting wind energy into another form of energy using a lighter-than-air craft configured to produce a positive net lift. The net lift includes both a net aerodynamic lift and a net buoyant lift. A tethering mechanism is configured to restrain the lighter-than-air craft with respect to the ground. The lighter-than-air craft defines an interior volume for containing a lighter-than-air gas, and the lighter-than-air craft has a fore section and an aft section. The tethering system has at least one attachment point on the fore section of the lighter-than-air craft and at least one attachment point on the aft section of the lighter-than-air craft. The lighter-than-air craft provides a stable aerodynamic moment with respect to a yaw axis about a center-of-mass of the lighter-than-air craft. The craft can be formed in a variety of aerodynamic profiles/shapes.

22 Claims, 14 Drawing Sheets

(56) References Cited

U.S. PATENT DOCUMENTS

| | | | |
|---|---|---|---|
| 4,350,898 A | 9/1982 | Benoit | 290/55 |
| 4,350,899 A | 9/1982 | Benoit | 290/55 |
| 4,398,865 A * | 8/1983 | Garkusha et al. | 415/148 |
| 4,450,364 A | 5/1984 | Benoit | 290/55 |
| 4,470,563 A * | 9/1984 | Engelsman | 244/33 |
| 4,789,302 A | 12/1988 | Gruzling | 415/221 |
| 4,832,571 A | 5/1989 | Carrol | 416/132 B |
| 5,836,738 A | 11/1998 | Finney | 415/60 |
| 6,382,904 B1 | 5/2002 | Orlov et al. | 415/4.5 |
| 7,129,596 B2 * | 10/2006 | Macedo | 290/55 |
| 7,287,723 B2 * | 10/2007 | Barnes | 244/31 |
| 7,317,261 B2 * | 1/2008 | Rolt | 290/55 |
| 7,335,000 B2 | 2/2008 | Ferguson | 417/7 |
| 7,552,894 B2 * | 6/2009 | Barnes | 244/31 |
| 7,582,981 B1 | 9/2009 | Meller | 290/44 |
| 7,602,077 B2 * | 10/2009 | Ferguson | 290/55 |
| 7,709,973 B2 * | 5/2010 | Meller | 290/55 |
| 7,723,861 B2 * | 5/2010 | Meller | 290/55 |
| 7,775,483 B2 * | 8/2010 | Olson | 244/153 R |
| 7,775,761 B2 * | 8/2010 | Ferguson | 415/7 |
| 7,786,610 B2 * | 8/2010 | Potter | 290/55 |
| 7,821,149 B2 * | 10/2010 | Meller | 290/44 |
| 7,859,126 B2 * | 12/2010 | Ferguson | 290/44 |
| 7,938,364 B2 * | 5/2011 | Tillotson | 244/127 |
| 8,109,711 B2 * | 2/2012 | Blumer et al. | 415/2.1 |
| 8,148,838 B2 * | 4/2012 | Ferguson | 290/44 |
| 8,247,912 B2 * | 8/2012 | Da Costa Duarte Pardal et al. | 290/44 |
| 8,541,897 B2 * | 9/2013 | Khoshnevis | 290/44 |
| 8,678,309 B2 * | 3/2014 | Heppe | 244/30 |
| 8,864,064 B2 * | 10/2014 | DiMarzio et al. | 244/33 |
| 2006/0251505 A1 * | 11/2006 | Ferguson | 415/4.1 |
| 2007/0012819 A1 * | 1/2007 | Barnes | 244/30 |
| 2007/0013196 A1 | 1/2007 | Chen | 290/55 |
| 2007/0176432 A1 * | 8/2007 | Rolt | 290/55 |
| 2008/0048453 A1 | 2/2008 | Amick | 290/44 |
| 2008/0169376 A1 * | 7/2008 | Barnes | 244/30 |
| 2008/0181773 A1 * | 7/2008 | Ferguson | 416/9 |
| 2008/0296905 A1 * | 12/2008 | Ferguson | 290/55 |
| 2009/0278353 A1 * | 11/2009 | Da Costa Duarte Pardal et al. | 290/44 |
| 2009/0302149 A1 * | 12/2009 | Fuchs et al. | 244/2 |
| 2010/0013226 A1 * | 1/2010 | Blumer et al. | 290/44 |
| 2010/0026007 A1 * | 2/2010 | Bevirt | 290/55 |
| 2010/0032947 A1 | 2/2010 | Bevirt | 290/44 |
| 2010/0032949 A1 * | 2/2010 | Varrichio et al. | 290/44 |
| 2010/0032956 A1 * | 2/2010 | Varrichio et al. | 290/55 |
| 2010/0032963 A1 * | 2/2010 | Ferguson | 290/55 |
| 2010/0066093 A1 * | 3/2010 | Meller | 290/55 |
| 2010/0066095 A1 * | 3/2010 | Meller | 290/55 |
| 2010/0068052 A1 * | 3/2010 | Werle et al. | 415/220 |
| 2010/0090473 A1 | 4/2010 | Glass | 290/55 |
| 2010/0117363 A1 * | 5/2010 | Meller | 290/52 |
| 2010/0133385 A1 * | 6/2010 | Olson | 244/155 A |
| 2010/0140390 A1 | 6/2010 | Goodall | 244/30 |
| 2010/0232988 A1 * | 9/2010 | Creighton et al. | 417/334 |
| 2010/0259050 A1 * | 10/2010 | Meller | 290/55 |
| 2011/0101692 A1 * | 5/2011 | Bilaniuk | 290/44 |
| 2011/0109097 A1 * | 5/2011 | Ferguson | 290/55 |
| 2011/0121578 A1 * | 5/2011 | Ferguson | 290/55 |
| 2011/0192938 A1 * | 8/2011 | DiMarzio et al. | 244/53 R |
| 2012/0235410 A1 * | 9/2012 | Serrano | 290/50 |
| 2012/0312918 A1 * | 12/2012 | Heppe | 244/30 |
| 2013/0037650 A1 * | 2/2013 | Heppe | 244/2 |
| 2013/0115544 A1 * | 5/2013 | Davidson et al. | 429/505 |
| 2013/0118173 A1 * | 5/2013 | Cardoso | 60/698 |
| 2014/0001308 A1 * | 1/2014 | Costa Duarte Pardal et al. | 244/29 |
| 2014/0227092 A1 * | 8/2014 | Wood | 415/207 |
| 2014/0246862 A1 * | 9/2014 | Garcia-Sanz et al. | 290/55 |

* cited by examiner

LIGHTER-THAN-AIR CRAFT FOR ENERGY-PRODUCING TURBINES

RELATED APPLICATIONS

This application is a continuation-in-part of co-pending U.S. patent application Ser. No. 12/579,839, filed Oct. 15, 2009, entitled POWER-AUGMENTING SHROUD FOR ENERGY-PRODUCING TURBINES, the entire disclosure of which is herein incorporated by reference, which claims the benefit of Application Ser. No. 61/105,509, filed Oct. 15, 2008, entitled AIRBORNE POWER AUTMENTING SHROUD FOR WIND TURBINES, the entire disclosure of which is also herein incorporated by reference.

FIELD OF THE INVENTION

The present invention relates to a lighter-than-air craft for energy-producing turbines. More particularly, the present invention pertains to craft geometries that can provide with a stable flight platform for energy-producing turbines.

BACKGROUND OF THE INVENTION

Though wind energy is increasingly popular, especially with the threat of global climate change, the cost of energy from wind farms is still not competitive with that of more conventional power sources. Additionally, most of the top-tier wind farm sites have already been taken, forcing new developments to move to less favorable environments which will make the large scale deployment of wind energy all but impossible with current technology.

Windmills in recent years have become more effective and competitive with other energy sources, but most still remain very expensive to install. As a result, their overall cost per installed kilowatt (kW) is still high enough that they are only marginally deployed and contribute only a small amount to the "electrical grid."

The primary configuration of modern windmills is a horizontally-mounted, large diameter, three-bladed propeller that rotates at low revolutions-per-minute (rpm's) over a very large swept area. The higher the rotational axis of the propeller can be mounted, the better, as the natural speed of the wind increases with an increase in the height above the ground. Conventional windmills thus have very tall and very strong tower structures. Typically, they have a tubular steel tower that is mounted to a deep, subterranean cement base. The system has to be very carefully engineered and sited appropriately for the surrounding terrain. The towers must maintain a central stairway or other means to allow construction and operator access to the upper mechanicals. The tower must accommodate the heavy gearbox, electrical turbine, and propeller assembly, as well as be strong enough to withstand gale force winds, and potentially earthquakes. To make the system even more complicated, the upper nacelle and gearbox/turbine housing must be able to pivot on a vertical axis, so as to align the propeller correctly with the wind direction at any time during the day or night.

On many windmill systems the individual blades of the windmill are able to rotate about their individual longitudinal axis, for pitch control. They can optimize the pitch of the blades depending on the nominal wind speed conditions that are present at anyone time at the site. They can also change the pitch of the blade to "feather" the propeller if the nominal wind speeds are too large. Occasionally the windmill is locked to prevent rotation, and the blades feathered to prevent major damage to the machine in a storm. All of this pitch control technology adds significantly to the cost of windmills.

Another major disadvantage with conventional windmills is damage caused by lightning during thunderstorms. The blades can be upwards of 300 feet in the air and are a good source for lightning to find a conductive path to the ground. Some of the more recently designed windmills use a system of replaceable sacrificial lightning conduction attractors that are built into each windmill propeller blade. They help channel the lightning away from the vulnerable composite structure that comprises the blade itself. The fact remains that one of the major causes of windmill downtime and maintenance costs are caused by lightning damage.

The size of many windmills is also a major problem for inspection, diagnostics, and repair. Often workmen have to use ropes and climbing techniques to perform maintenance on the massive machines. It is very expensive and dangerous. In recent years workmen have fallen to their death trying to repair the blades.

There have been a number of proposals for more efficient and/or cost effective means of harvesting the wind's energy in order to combat the high price of wind energy. There has been considerable effort put into developing diffuser-augmented wind turbines, which have considerably higher power output for a given size rotor than conventional turbines. However, the cost of the diffuser has not justified their commercial implementation.

Some effort has also been made to develop high-altitude wind harvesters, as high-altitude winds are considerably stronger than ground level winds and are present almost everywhere. In one example of this effort, it has been proposed to provide tethered wind turbines that are deployed at or above ground level. See U.S. Published Application 20080048453 to Amick, the disclosure of which is incorporated herein by reference in its entirety.

However, no conventional windmill yet addressees the foregoing problems while providing for cost-effective wind-energy production.

SUMMARY OF THE INVENTION

The present invention addresses problems encountered in prior art apparatus, and encompasses other features and advantages, through the provision, in an illustrative embodiment, of a lighter-than-air (LTA) craft for an airborne wind-turbine for converting wind energy into another form of energy, the craft being disclosed in an illustrative embodiment as a shroud having a ring-like shape having an airfoil cross-section and defining an interior volume for containing a lighter-than-air (LTA) gas. For the shroud embodiment the shroud includes a central opening oriented along a longitudinal axis of the shroud, and is further configured to produce an asymmetric moment of left and right lateral sections thereof, which asymmetric moment yields a restoring moment that automatically orients the longitudinal axis of the shroud substantially optimally relative to a prevailing wind direction. In addition to the shroud structure other geometries are considered as falling within the scope of the present invention including, inter alia, craft that supports turbines or other mechanisms for converting kinetic wind energy into other useful forms of energy.

In accordance with another feature of the present invention there is provided a wind-based power generating system that includes a wind energy converter for converting wind energy into another form of energy; a lighter-than-air craft configured to produce a neutral or positive net lift to the wind energy converter, the net lift including a net aerodynamic lift and a net buoyant lift; and a tethering system configured to restrain the lighter-than-air craft with respect to the ground. The lighter-than-air craft defines an interior volume for containing a lighter-than-air gas, and the lighter-than-air craft has a fore section and an aft section. The tethering system has at least one attachment point on the fore section of the lighter-than-air craft and at least one attachment point on the aft section of the lighter-than-air craft, and the lighter-than-air craft is constructed and arranged to generate a stable aerodynamic moment with respect to a yaw axis about a center-of-mass of the lighter-than-air craft.

BRIEF DESCRIPTION OF THE DRAWINGS

The invention description below refers to the accompanying drawings, of which.

DETAILED DESCRIPTION

Figure 1:
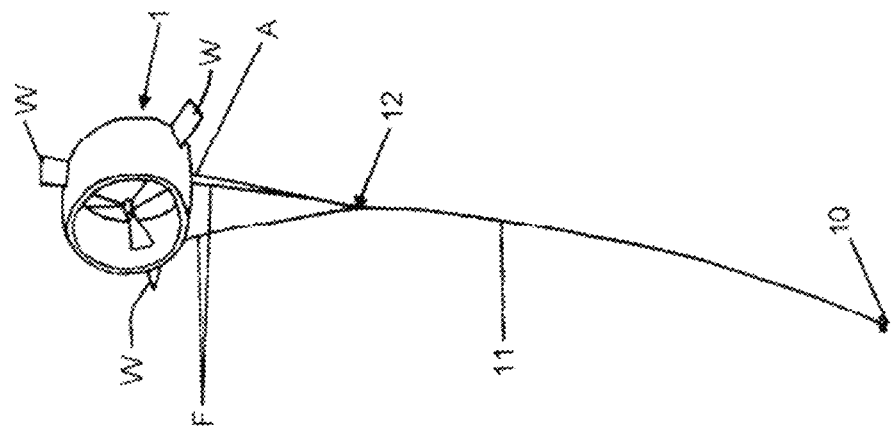
FIG. 1 depicts an exemplary wind-turbine system incorporating the inventive shroud according to an illustrative embodiment.

Referring now to the drawings, wherein like numerals refer to like or corresponding parts throughout the several views, the present invention is generally characterized as a lighter-than-air craft that can be constructed and arranged as a power-augmenting or non-power-augmenting shroud for an airborne wind turbine for converting wind energy into energy (e.g., electrical energy), such as, for instance, an airborne wind-turbine of the type disclosed in above-incorporated U.S. Published Application 20080048453 to Amick.

Figure 2:
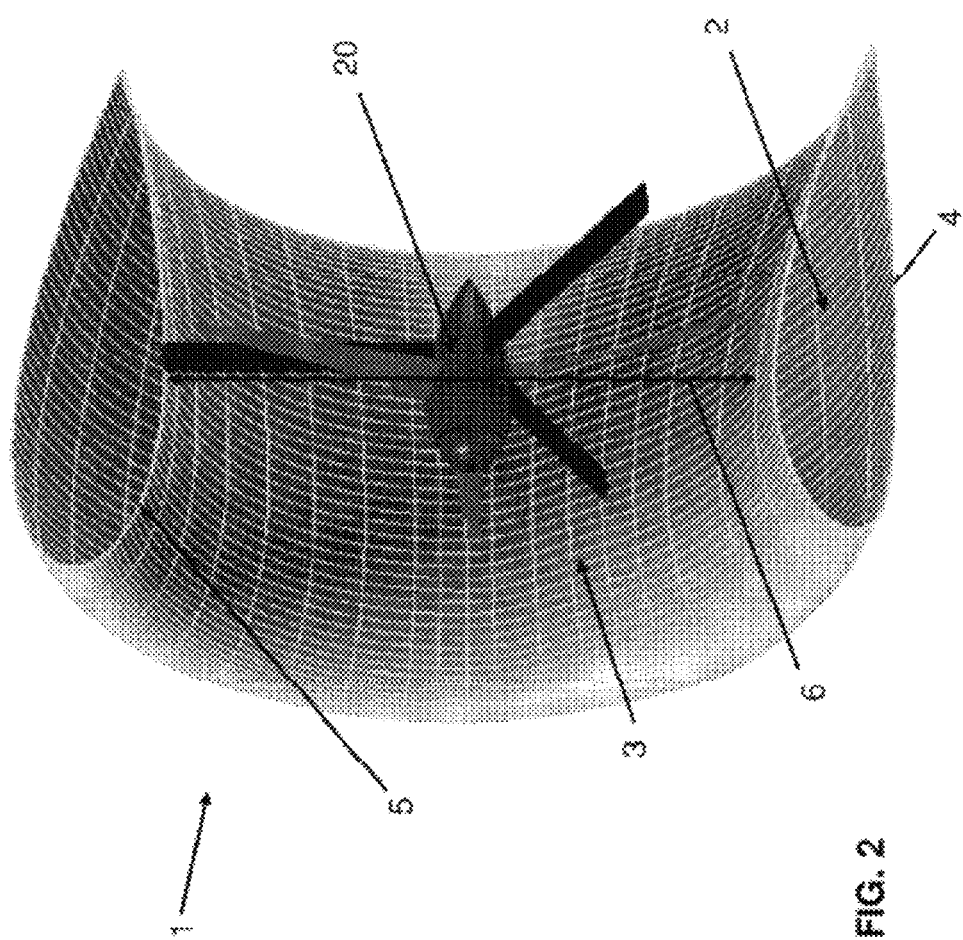
FIG. 2 is a cross-sectional view of an exemplary shroud according to an illustrative embodiment of the present invention.

In the following description reference is made to the use of a lighter-than-air (LTA) shroud. Illustratively, FIGS. 1 and 2 depict such a shroud arrangement. However, in other embodiments disclosed herein the turbines or other wind converters are illustrated as supported from other structures, referred to herein generally as "craft". For other structures refer, for example, to FIGS. 7-14.

The shroud 1 is a "lighter-than-air" (LTA) shroud, and is thereby dimensioned to define an internal volume 2 capable of holding a sufficient volume of lighter-than-air gas to provide buoyant lift for overcoming the weight of the airborne components of the wind turbine system comprising the "Lighter-than-air" (LTA) shroud, wind turbine and related components, and tether, and maintaining the wind turbine at heights substantially above ground level where wind speeds are generally higher (see FIG. 2). To this end, the material of the shroud is preferably impermeable to egress of a suitable lighter-than-air gas contained therein, such as, by way of non-limiting example, helium, and is, furthermore, impermeable to ingress of outside air. According to the exemplary embodiment, fabrication and operation of the shroud can utilize materials, subsystems and processes such as those used in other "Lighter-than-air" (LTA) devices (e.g., aerostats). In the exemplary embodiment, a mechanism is also provided for maintaining the volume of lighter-than-air gas at acceptable pressure, and further for substantially maintaining the shape and size of the shroud, in varying atmospheric conditions. Such a mechanism can include, by way of non-limiting example, internal ballonets, subdividing the internal volume of the shroud to define multiple internal compartments, etc.

Referring to FIG. 1, the shroud 1, along with all other associated airborne components of the wind turbine system of which it is a part, can be lowered and raised from a base station 10 by employing a tether 11. Any conventional mechanism, including such as disclosed, for example, in Amick, U.S. Publication Number 2008-0048453, can be employed to provide for the selective raising and lowering of the shroud 1 via the tether 11.

Once airborne, the tethered shroud 1 passively floats downwind of the base station. As wind direction changes, the drag force on the shroud 1, by virtue of its design as explained further herein, causes the shroud 1 to passively change its location with respect to the base station 10, thereby automatically maintaining a down-wind position with respect to the new wind direction.

Tether 11 is secured to shroud 1 at fore F and aft A attachment points so that the shroud's center of pressure is located downwind of the tether's fore F attachment points. Tether 11 is further attached to the shroud 1 at a location so that the aerodynamic forces on the shroud 1 passively restore the minimum radius section thereof to be oriented approximately normal to the direction of airflow. The passive stability and control of shroud 1 can, optionally, be further improved by moving the shroud's center of pressure aft through the employment of aft stabilizers, such as flat winglets or fins (depicted as structures W in FIG. 1), on the exterior of shroud 1. Furthermore, the center of buoyancy and center of gravity of shroud 1 (taking into account the wind turbine components disposed therein) are both located between the fore F and aft A tether attachment points and as close to each other as possible. Note that the wings (or where relatively small in reference to the overall surface size—winglets) or fins on any of the embodiments described herein can be implemented in accordance with a variety of arrangements. As shown, three wings or fins W are employed in a triangular orientation. Alternatively four or more wings or fins can be employed in an appropriate geometrical arrangement (e.g. an orthogonally crossing pattern of four fins, a pentagonal arrangement, etc.)

While capable of employment at a variety of scales, it is contemplated that shroud 1 can be dimensioned to accommodate wind turbines with minimum rotor diameters of approximately 5 to 10 meters (e.g. 6 meters), and is highly variable. Likewise, the number and arrangement of rotor blades is also highly variable.

Referring also to FIG. 2, the shroud 1 passively maintains the wind turbine system approximately aligned with the direction of wind at heights above ground level, while increasing the power output of the enshrouded wind turbine by increasing the upstream size of the captured stream tube 3 through aerodynamic diffusion of the airflow therethrough. To these ends, the shroud 1 is essentially characterized by a ring-like shape the cross-section of which is an airfoil shape with (except where the airfoil is symmetric) the high-pressure surface 4 oriented toward the shroud exterior and the low-pressure surface 5 oriented towards the shroud interior (the captured stream tube 3) with the chord oriented in the direction of airflow at a geometric angle of attack ($\alpha_{geometric}$) equal to or greater than zero. According to the exemplary embodiment, the airfoil sectional thickness is in the range of from approximately 12% to approximately 30%, while the chord/radius ratio is approximately 1-5.

It is contemplated that, optionally, shroud 1 can further comprise additional lift surfaces, such as wings W, disposed on the exterior of shroud 1. Wings or winglets on any of the embodiments herein can extend approximately horizontally from opposing sides of the craft and/or can define a slight acute upward or downward angle (as shown in FIG. 1). The term "approximately horizontal" shall be deemed to include such acute angles—e.g. up to an angle of approximately 20-40 degrees with respect to the horizontal plane perpendicular to gravity and parallel to the flat ground.

Still referring to FIG. 2, shroud 1 is further shaped such as to provide a circular section (denoted by line 6) of minimum radius approximately normal to the wind flow and a divergent section downstream (i.e., aft of the wind turbine 20) thereof. The enshrouded wind turbine 20 is placed such that the turbine blades sweep out this minimum radius circular section 6 as they rotate. The foregoing design passively augments the power conveyed through the enshrouded wind turbine by increasing the mass flow of air through the enshrouded wind turbine 20.

Figure 3:
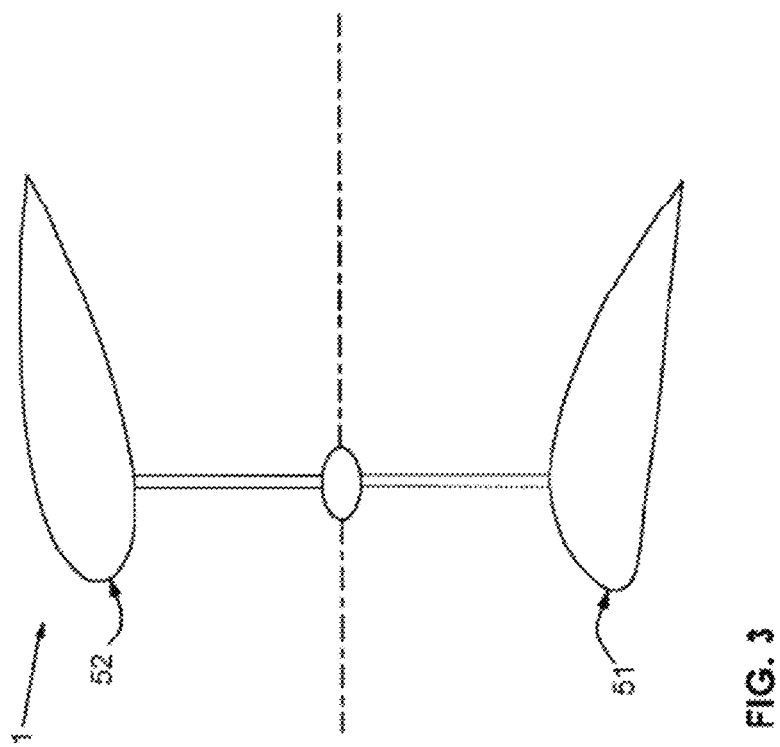
FIG. 3 is a vertical cross-sectional view of the exemplary shroud of FIG. 2.

The drag force on shroud 1 increases parabolically as the wind speed increases, and this additional force tends to lower the height of the shroud 1. Compensation against this drag force is provided for by an equivalent increase in lift force, and to this end shroud 1 is, in one embodiment, shaped to provide additional lift force through positive net aerodynamic lift produced by utilization of high local lift airfoils proximate the bottom 51 (relative to the base station) of shroud 1 and low local lift airfoils proximate the top 52 (relative to the base station) of shroud 1 (see also FIG. 3). Consistent with aerodynamic principles, these airfoil sections are constructed and arranged to produce high or low lift through any combination of high or low lift coefficients, and larger or smaller local chord lengths or angles of attack. Note that in various embodiments herein, the LTA shroud/craft geometry can alternatively be constructed and arranged to produce a neutral lift or a small positive net lift so long as the lift derived from buoyancy is sufficient to maintain sufficient suspension of the power-generating assembly.

Figure 4:
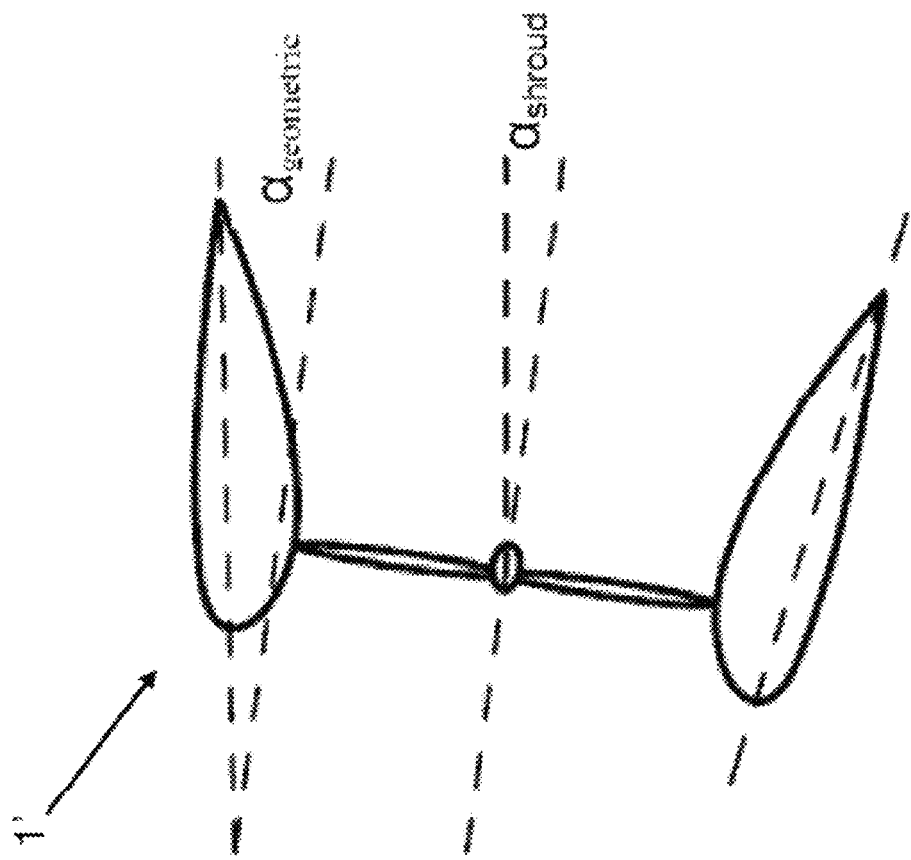
FIG. 4 is a diagrammatic vertical cross-sectional depiction of an exemplary shroud according to a further illustrative embodiment of the present invention.
Figure 5:
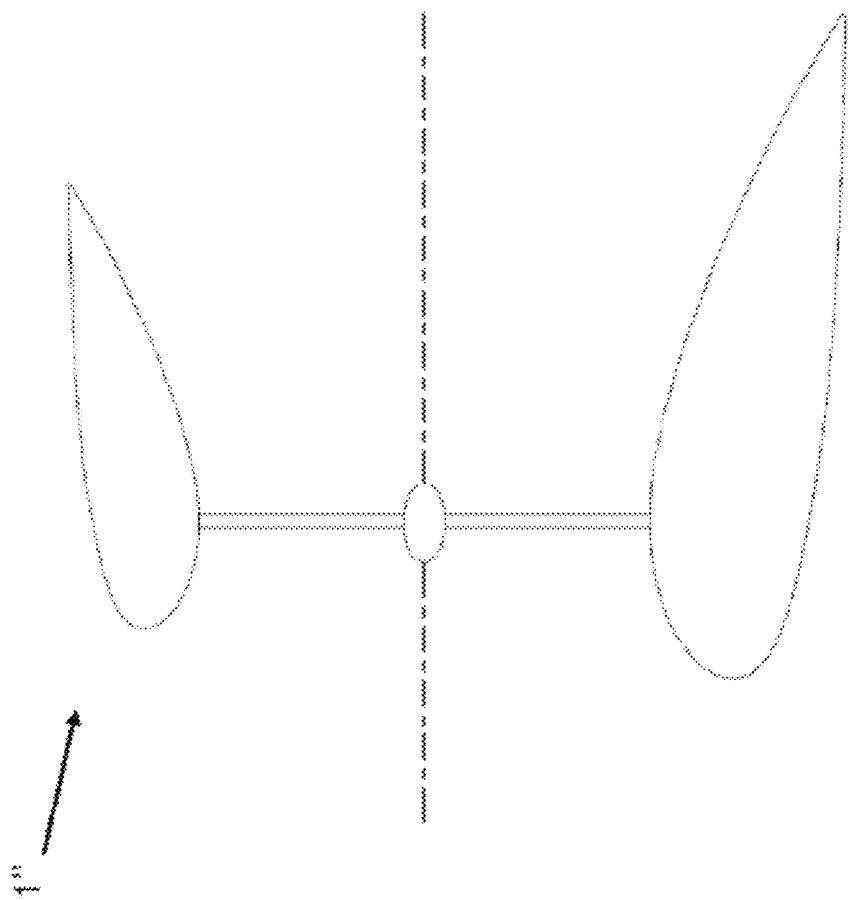
FIG. 5 is a diagrammatic vertical cross-sectional depiction of an exemplary shroud according to a still further illustrative embodiment of the present invention.

In addition, or alternatively, to the higher coefficient-of-lift airfoil sections at the bottom of shroud 1, the shroud can be configured to operate at a positive angle of attack ($\alpha_{shroud}$) (FIG. 4), and/or to employ larger airfoil sections at the bottom relative to those at top (FIG. 5).

A mechanism can be provided to dynamically control the angle of attack of the shroud ($\alpha_{shroud}$) to provide lower or higher lift as necessary through, by way of an illustrative example, dynamic lengthening and shortening of the fore F and/or aft A attachment point harness lines. Such a mechanism can, for instance, comprise one or more mechanical winches disposed, for instance, at the juncture 12 where tether 11 comprises the separate lines extending to the fore F and/or aft A attachment points. According to this embodiment, each such winch operates to selectively shorten the length of the associated line extending to one or more of the fore F and/or aft A attachment points. Alternatively, such a mechanism can be provided at or proximate the base station, according to which embodiment it will be appreciated that tether can comprise a plurality of separate lines extending between the base station and each of the fore F and/or aft A attachment points.

Figure 6:
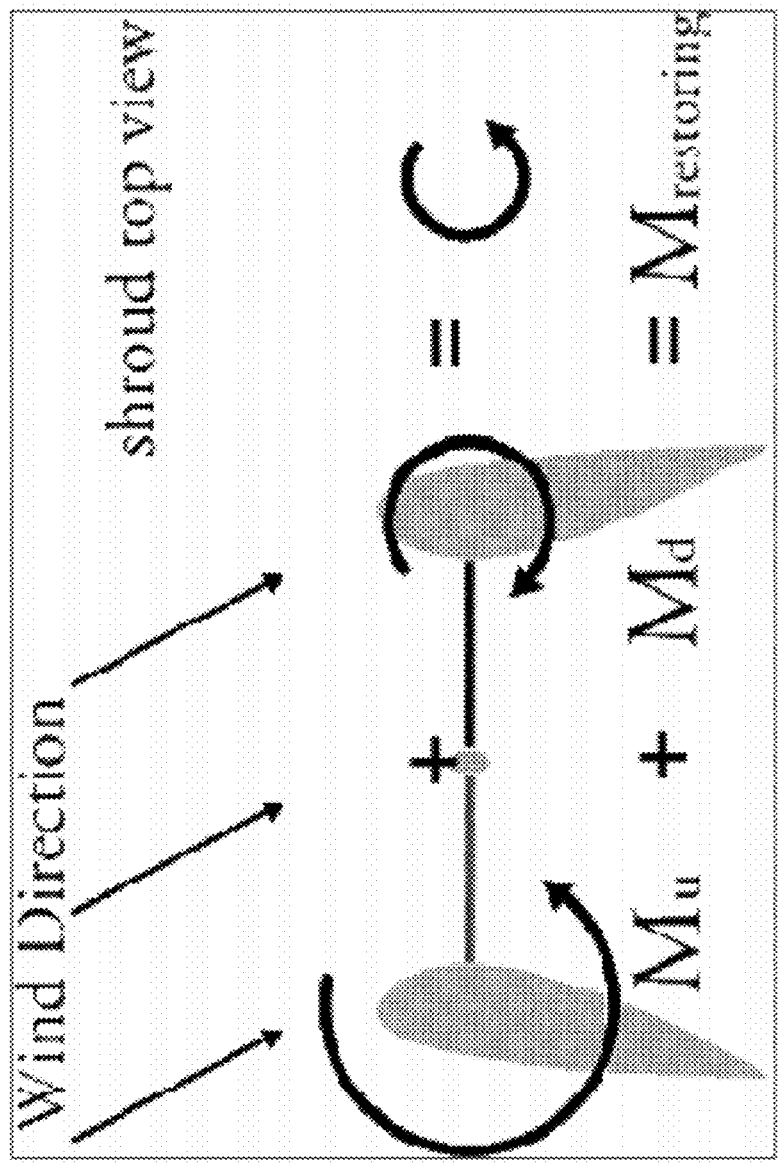
FIG. 6 is a diagrammatic horizontal cross-sectional depiction of the inventive shroud illustrating the principle of operation of the shroud configuration producing the asymmetric moment of left and right lateral sections thereof.

Referring to FIGS. 2 and 6, shroud 1 is configured to produce an asymmetric moment of left and right lateral sections thereof, which asymmetric moment yields a restoring moment that automatically orients the longitudinal axis of shroud 1 (defined along the centerline through stream tube 3) substantially optimally relative to the prevailing wind direction. This is particularly beneficial for higher frequency variations in wind direction, as the shroud 1 will passively "weather-vane" about the base station 10 in conditions of low frequency variations in wind direction. Generally speaking, this restoring moment is produced by the asymmetric moment of the left and right shroud sections, which are operating at different "angles of attack" when shroud 1 is yawed with respect to the prevailing wind direction. More particularly, the airfoil sections of shroud 1 are, in the exemplary embodiment of the invention, shaped such as to produce a "locally nose-down" moment about the airfoil quarter-chord. In the event of a non-zero yaw angle ($\theta yaw \neq 4$), such as occurs when wind direction shifts, the upwind shroud sections operate at a local angle of attack, $\alpha_{upwind} = \alpha_{geometric} + \theta yaw$, which is greater than the downwind shroud sections angle of attack, $\alpha_{downwind} = \alpha_{geometric} - \theta yaw$, and subsequently the upwind shroud sections produce a larger "locally nose-down" moment ($M_u$), than the downwind shroud sections ($M_d$). This asymmetric aerodynamic moment sums to produce a net restoring moment ($M_{restoring}$) that points shroud 1 in the direction of the wind.

It will be understood from the foregoing disclosure that the asymmetric moment described above can be tailored to ensure an appropriate response to wind variations by employing airfoils with higher or lower moment coefficient.

While the disclosure heretofore has comprehended a shroud for an airborne wind-turbine, it is contemplated that the inventive shroud can, with only modest modification from the foregoing disclosure, be employed in an underwater environment as part of a water-turbine. According to such an illustrative embodiment, the power-augmenting shroud and associated, enshrouded water turbine can be secured to a suitable base, such as, for instance, a tether or tower, whereby the shroud is permitted to pivot in the water so as to automatically orient itself substantially optimally relative to a prevailing water direction.

As with the embodiment of the shroud described above for employment in a wind-turbine system, the shroud according to this embodiment of the invention is likewise configured to produce rotation about an axis of rotation upstream of the center of pressure and substantially perpendicular to the longitudinal axis of the shroud, so as to automatically orient the longitudinal axis of the shroud substantially optimally relative to a prevailing water direction.

Unlike the embodiment of the invention for airborne employment, however, it will be appreciated that the underwater variant is not necessarily filled with a "lighter-than-air" gas, although buoyancy of the shroud (including in combination with any enshrouded turbine components) is required where the shroud is tethered to a base station. This is contrasted with embodiments where the shroud is pivotally connected to a rigid tower secured to the underwater floor or other substrate, in which case buoyancy of the shroud is plainly not required. Further according to such embodiments, it is likewise appreciated that changes on the shroud's angle-of-attack can be effected employing other than fore and aft tether attachment points such as heretofore described.

Lighter-than-Air (LTA) Craft for Support of Wind Converters

Reference is now made to further embodiments of the present invention such as illustrated in FIGS. 7 through 14. These other embodiments disclose the use of turbines or other wind converters, as supported from other structures, referred to herein as a craft or a "lighter-than-air" (LTA) craft. Where earlier disclosed embodiments describe the use of an encompassing shroud, the embodiments illustrated in FIGS. 7 through 14 disclose other craft for the support of turbines or other wind converters, including, but not limited to, semi-circular structures, winged structures and open structures. The LTA craft structures of the present invention provide aerodynamic and buoyant lift; corrective yaw moment (in conjunction with any aerodynamic structures present, and not necessarily due to an asymmetric moment); and a mounting for a wind energy converter (but not necessarily "around" the turbine). These embodiments also illustrate various tether arrangements, in particular arrangements with 1, 2 or 3 (or more) primary tethers; fore and aft tether attachment points, and side-side attachment points. In one embodiment there are employed three primary tethers. Single and multiple turbine arrangements are disclosed and highly variable within ordinary skill.

Additional features include a tail or other structure which extends the aerodynamic structures (specifically vertical and horizontal stabilizers or control surfaces) substantially downstream of the rest of the craft; winglets or horizontal stabilizers arranged to improve stability and rotational damping about a pitch axis; a different mechanism for the actuation of the tether system, which is either on the ground and independent for each primary tether, or with an actuator at the tether bridle point which shortens or lengthens the bridle/harness lines to impart a desired rotation position (pitch, roll) to the craft; different forms of the wind energy converter such as a single wind turbine, multiple wind turbines, or an aerovoltaic converter.

Figure 7:
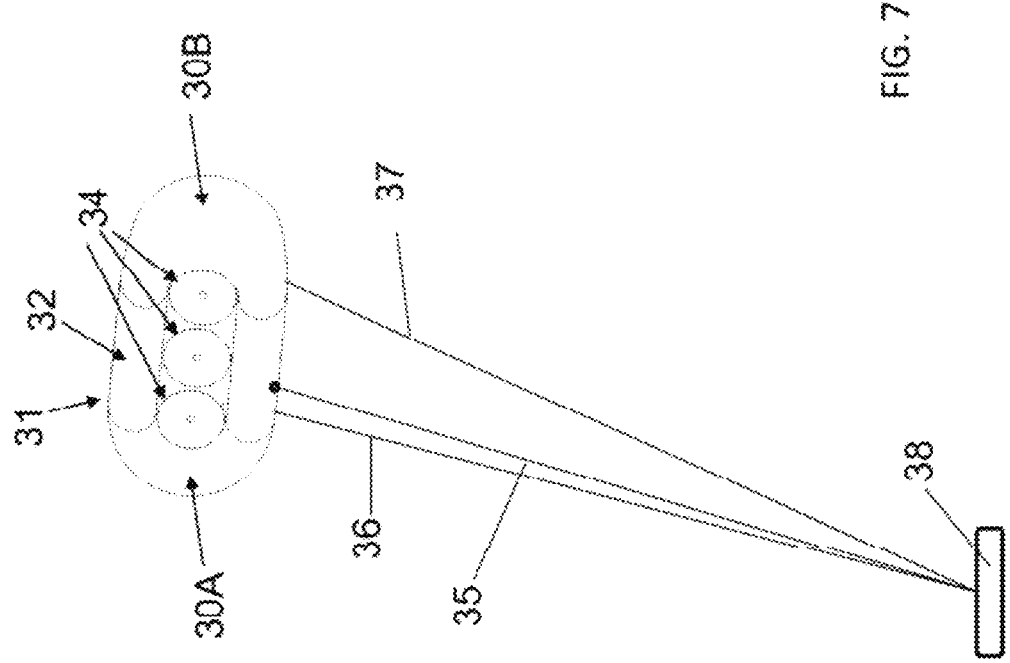
FIG. 7 depicts another embodiment of the present invention with a different craft style.

Reference is now made to FIG. 7 which depicts a craft 31 with a closed perimeter made up of two semi-circles 30A and 30B with a straight section 32 in between. The top and bottom portions are asymmetric, relative to the mid-plane. In this particular embodiment there are three turbines 34 that are mounted within the closed perimeter defined by members 30A, 30B and 32. FIG. 7 also illustrates a tether system that employs three primary tethers extend from the ground station 38 to the craft 31. This includes tethers 35, 36 and 37. Tether 35 is a fore tether with attachment at a fore location of the craft 31. Tethers 36 and 37 are respective aft tethers with attachments at an aft location. The aft tether attachments are spaced apart and secured to the craft 31 on the left and right sides thereof of the craft 31. In FIG. 7 the three turbines are schematically illustrated, but can, for example, be as shown at 20 in FIG. 1. The attachment location for the tethers is at an outer surface of the craft. Refer, for example, to the afore-mentioned Amick '453 publication for an illustration of an attachment used at the shroud.

Figure 8:
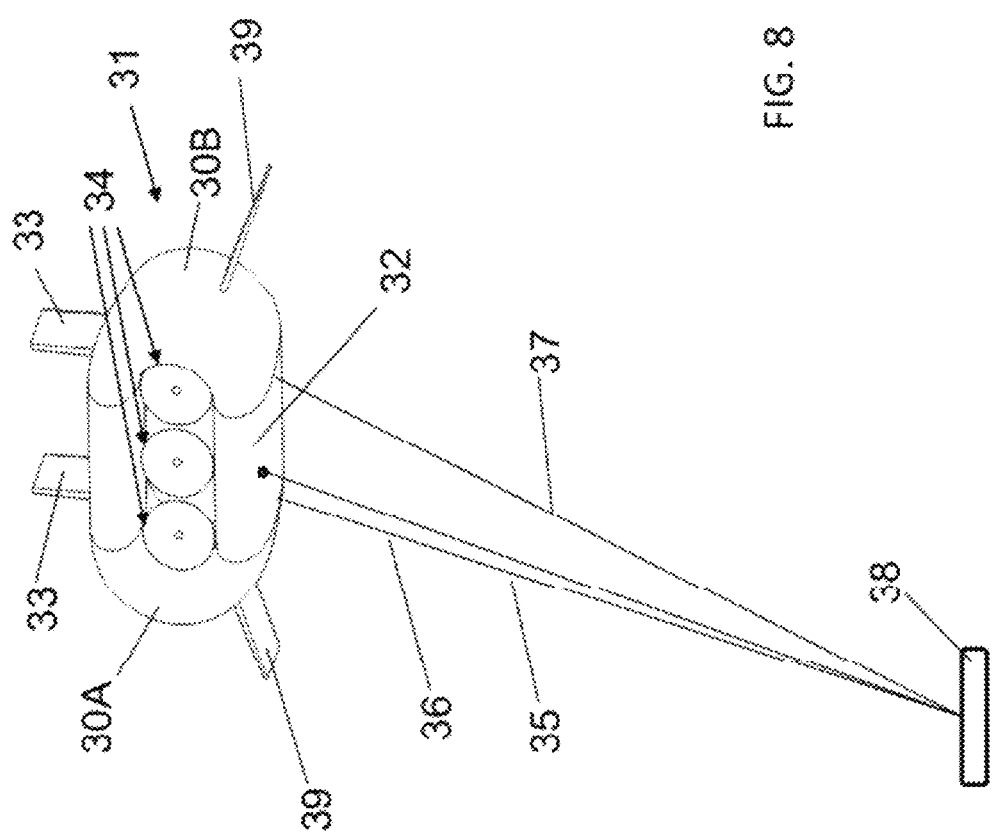
FIG. 8 depicts an illustrative embodiment similar to that shown in FIG. 7 but with added aerodynamic structures.

Reference is now made to FIG. 8 which depicts an embodiment similar to that shown in FIG. 7 but with added aerodynamic structures. Thus, this figure shows the craft 31 with the same features as illustrated in FIG. 7 wherein like reference numbers are used for common components. FIG. 8 depicts a craft 31 with a closed perimeter made up of two semi-circles 30A and 30B with a straight section 32 in between. The top and bottom portions are asymmetric, relative to the mid-plane. In this particular embodiment there are three turbines 34 that are mounted within the closed perimeter defined by members 30A, 30B and 32. FIG. 8 also illustrates a tether system that employs three primary tethers extend from the ground station 38 to the craft 31. This includes tethers 35, 36 and 37. Tether 35 is a fore tether with attachment at a fore location of the craft 31. Tethers 36 and 37 are respective aft tethers with attachments at an aft location directly from the base station. The aft tether attachments are spaced apart and secured to the craft 31 on the left and right sides thereof of the craft 31. In this embodiment two additional fins 33 (aerodynamic structures) have been added on the top section of the craft 31 for improved corrective yaw moment for yaw stability. Also, two additional winglets 39 (aerodynamic structures) have been added on the respective right (30B) and left (30A) sections of the craft, to add additional lift and stabilize the pitch and yaw moment, as needed.

Figure 9:
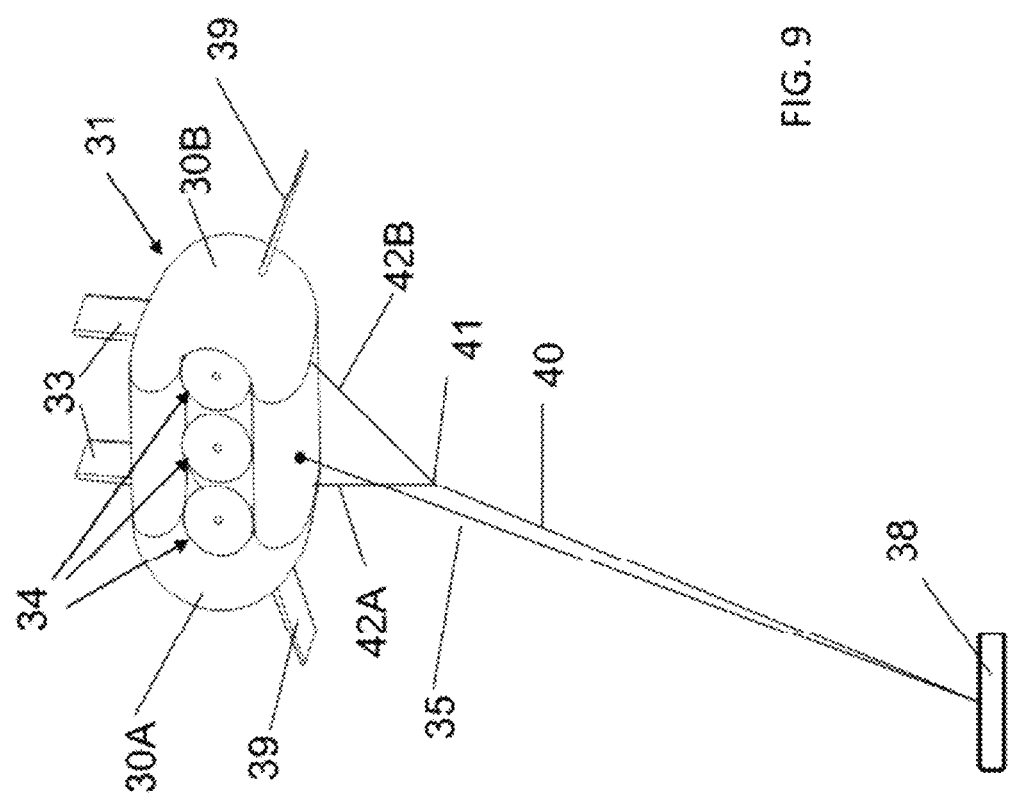
FIG. 9 depicts an illustrative embodiment similar to that shown in FIG. 8 but with a different tether system.

Reference is now made to FIG. 9 which depicts an embodiment similar to that shown in FIG. 8 but with an alternate tether system. Thus, this figure shows the craft 31 with the same features as illustrated in FIG. 7 wherein like reference numbers are used for common components. FIG. 9 depicts a craft 31 with a closed perimeter made up of two semi-circles 30A and 30B with a straight section 32 in between. The top and bottom portions are asymmetric, relative to the mid-plane. In this particular embodiment there are three turbines 34 that are mounted within the closed perimeter defined by members 30A, 30B and 32. FIG. 9 also illustrates a tether system that employs two primary tethers that extend from the ground station 38 to the craft 31. In FIG. 9 there is a primary fore tether 35 and a bridled tether 40 that includes a juncture point 41 that splits into bridles 42A and 42B. The additional aerodynamic structures illustrated in FIG. 9 can also be any combination of fins, winglets, wings, stabilizers, and other known structures, that can be added to the outer surface of the craft. In FIG. 9 the three turbines are schematically illustrated, but can be as shown at 20 in FIG. 1.

Figure 10:
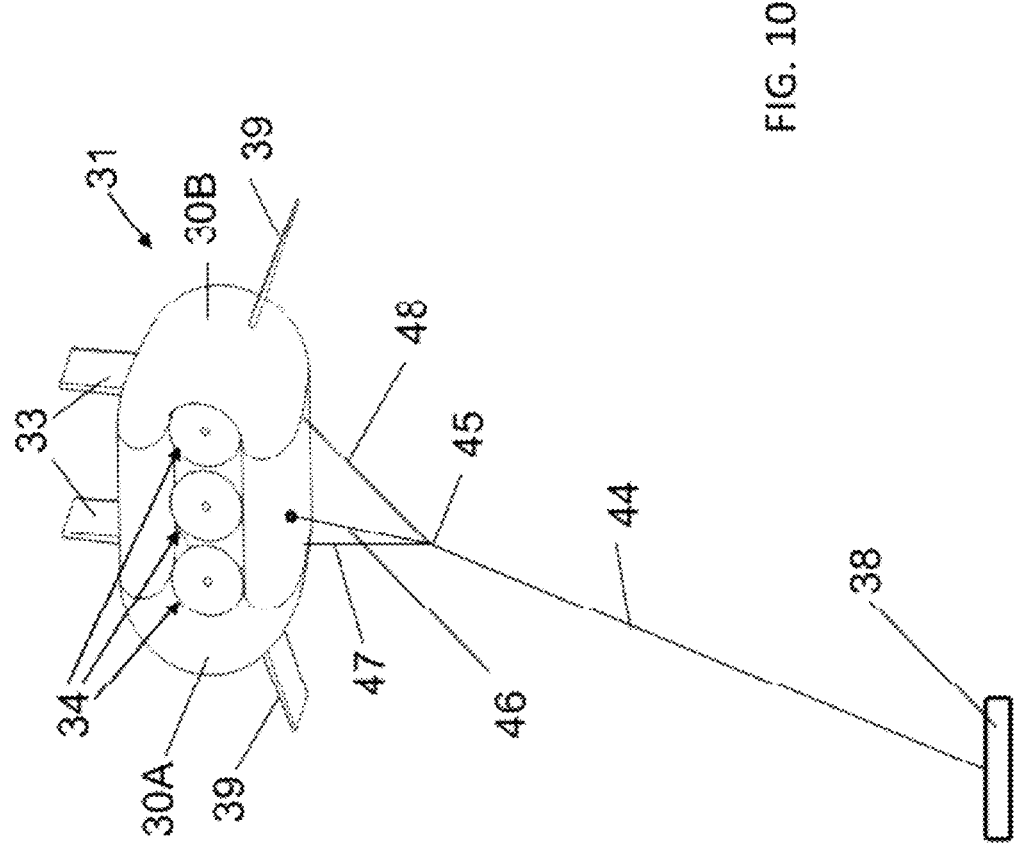
FIG. 10 depicts an illustrative embodiment similar to that shown in FIG. 8 but with still a different tether system.

Reference is now made to FIG. 10 which depicts an embodiment similar to that shown in FIG. 8 but with still a further alternate tether system. Thus, this figure shows the craft 31 with the same features as illustrated in FIG. 8 wherein like reference numbers are used for common components. FIG. 10 depicts a craft 31 with a closed perimeter made up of two semi-circles 30A and 30B with a straight section 32 in between. The top and bottom portions are asymmetric, relative to the mid-plane. In this particular embodiment there are three turbines 34 that are mounted within the closed perimeter defined by members 30A, 30B and 32. FIG. 10 illustrates a tether system that employs one primary tether 44 that extends from the ground station 38 to the craft 31. In FIG. 10 the tether 44 splits at the juncture point 45 into three separate bridles 46, 47 and 48. The tether incorporates a bridle point and bridles, having one attachment point on the fore section (tether 46) and two attachment points on the aft section (tethers 47 and 48) of the craft. The aft attachment points are located on the left and right sections of the craft 31. The additional aerodynamic structures illustrated in FIG. 10 can also be any combination of fins, winglets, wings, stabilizers, and other known structures that can be added to the outer surface of the craft. In FIG. 10 the three turbines are schematically illustrated, but can be as shown at 20 in FIG. 1.

Figure 11:
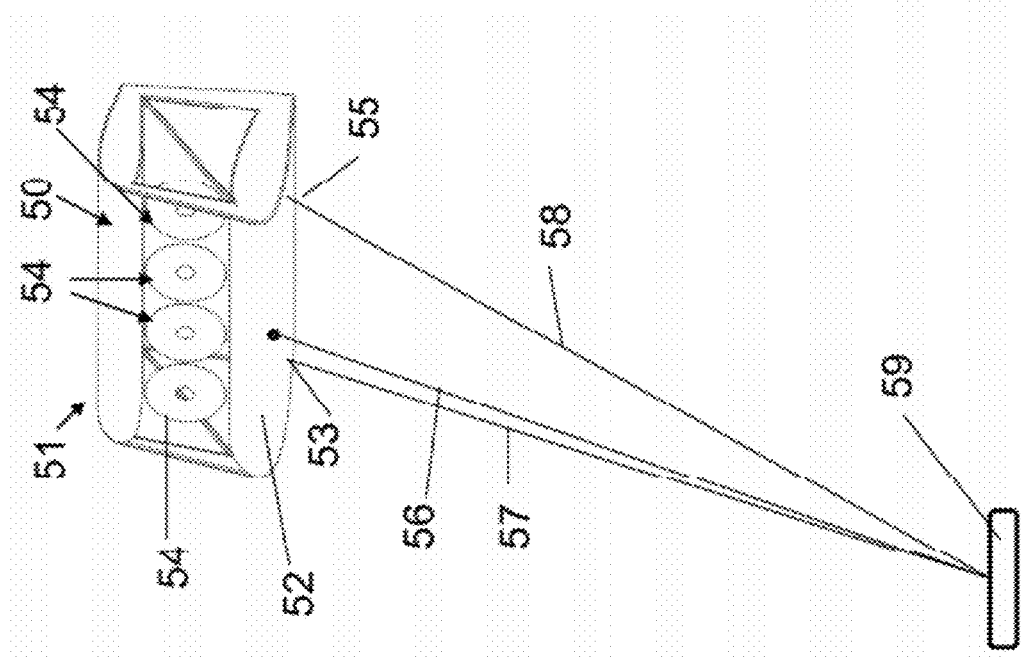
FIG. 11 depicts a further illustrative embodiment of the present invention employing a novel craft having upper and lower wing sections.

Reference is now made to FIG. 11 which depicts a further embodiment of the present invention employing a novel craft having upper and lower wing sections. In this particular embodiment there are no side walls (it is not a closed perimeter, as in the previous embodiments). Thus, in FIG. 11 the craft 51 has an upper wing section 50 and a lower wing section 52. The upper and lower sections are different in structure relative to each other. For example, the top or upper section may have a smaller cross-section than the bottom or lower section. In this particular embodiment there are four turbines 54 that are mounted between the upper and lower sections 50, 52. In this embodiment there are three separate primary tethers 56, 57 and 58 that commonly extend from the ground station 59 to the craft 51. FIG. 11 also illustrates the tethers as one fore tether 56 with an attachment point to the craft and two aft tethers 57, 58 each with an attachment point to the craft at a more aft location. The aft tether attachments are on respective left and right attachment points 53 and 55 of the craft. This embodiment should also employ fins or other aerodynamic structures (not shown, but similar to those illustrated in FIGS. 8-10) for corrective yaw moment for yaw stability.

Figure 12:
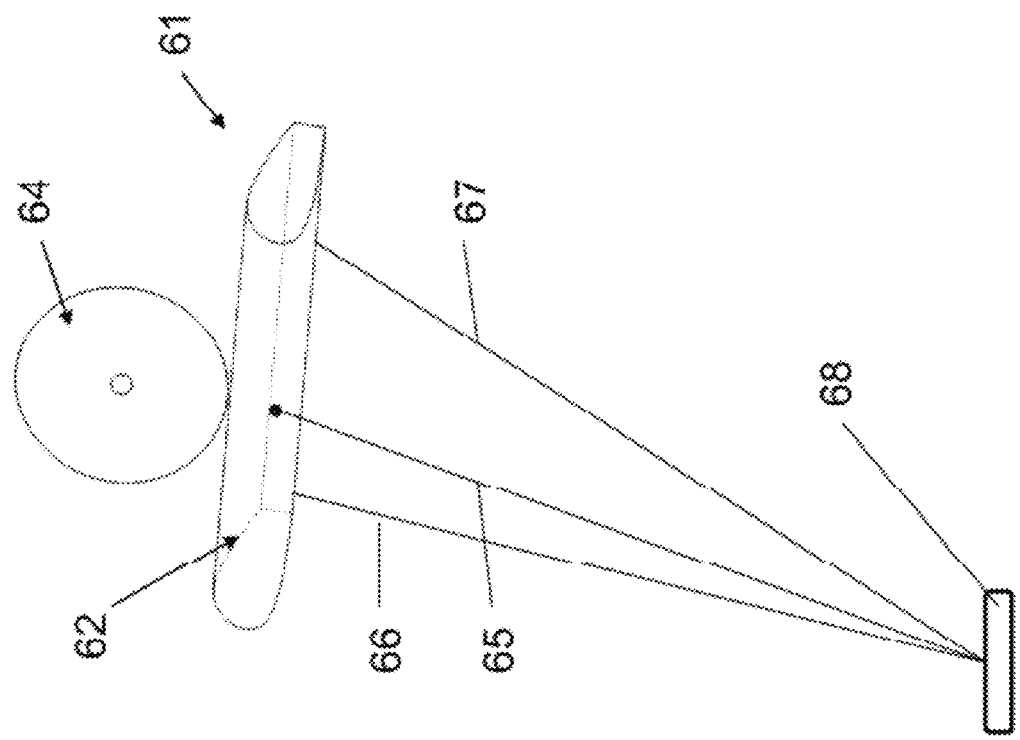
FIG. 12 depicts still a further illustrative embodiment of the present invention employing a single wing section.

Reference is now made to FIG. 12 which depicts a further embodiment of the present invention employing a novel craft 61 comprised of a single wing section 62. There are no side walls or "upper" and "lower" section. A single turbine 64 is mounted on top of the wing section 62. In this embodiment there are provided three primary tethers 65, 66 and 67 that extend from the ground station 68 to the craft 61. FIG. 12 also illustrates the tethers as one fore tether 65 with an attachment point to the craft and two aft tethers 66, 67 each with an attachment point to the craft at a more aft location. The aft tether attachments are on respective left and right attachment points of the craft in a similar manner to that illustrated in FIG. 11. This embodiment should also employ fins or other aerodynamic structures (not shown, but similar to that illustrated in FIGS. 8-10) for corrective yaw moment for yaw stability.

Figure 13:
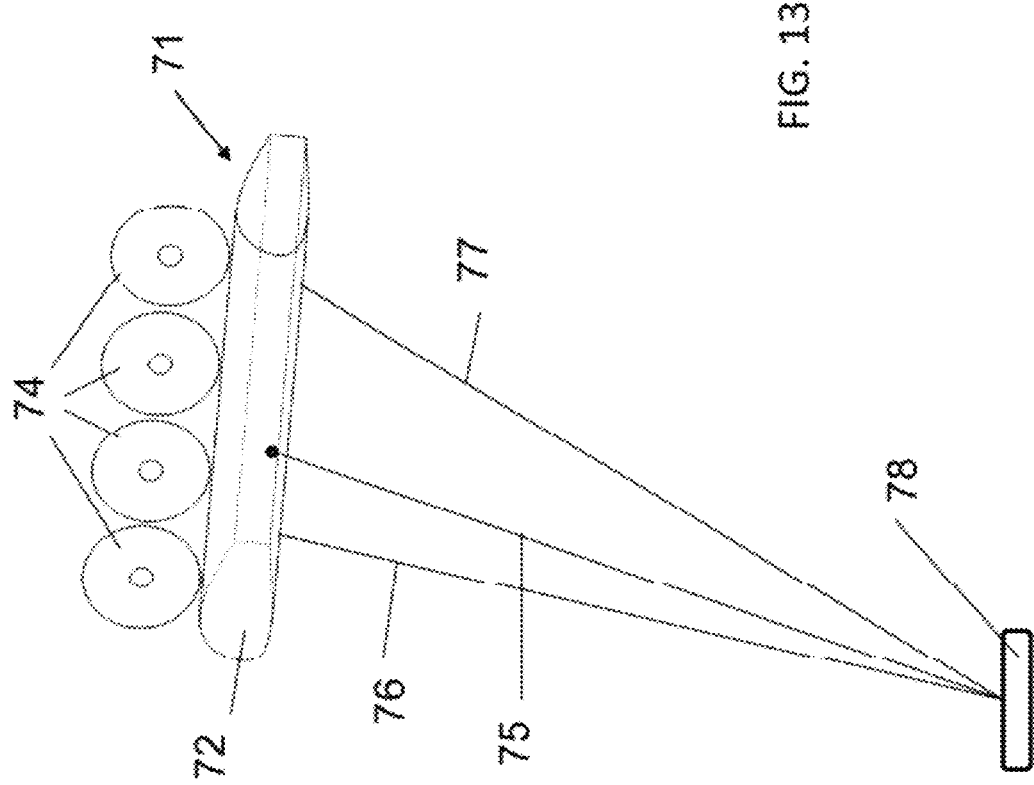
FIG. 13 depicts an embodiment similar to that shown in FIG. 12 but supporting multiple smaller turbines.

Reference is now made to FIG. 13 which depicts a further embodiment of the present invention employing a novel craft 71 comprised of a single wing section 72. In this embodiment four turbines 74 are mounted on top of the wing section 72. In this embodiment there are provided three primary tethers 75, 76 and 77 that extend from the ground station 78 to the craft 71. FIG. 13 also illustrates the tethers as one fore tether 75 with an attachment point to the craft and two aft tethers 76, 77 each with an attachment point to the craft at a more aft location. The aft tether attachments are on respective left and right attachment points of the craft in a similar manner to that illustrated in FIG. 11.

Figure 14:
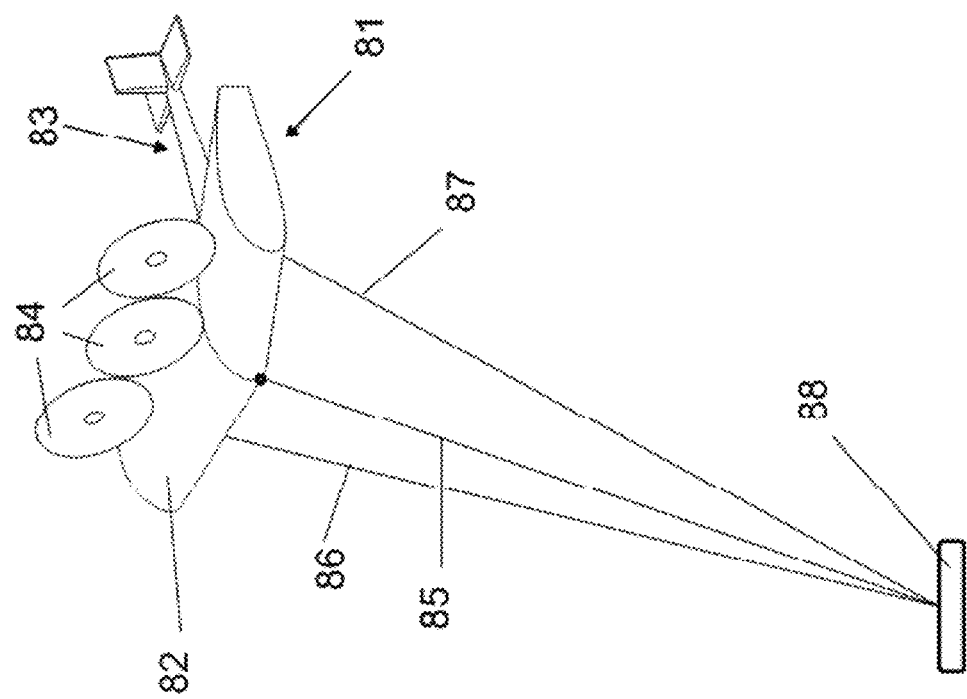
FIG. 14 depicts still another illustrative embodiment of the present invention employing a single wing section, but with no side walls or upper and lower wing sections.

Reference is now made to FIG. 14 which depicts a further embodiment of the present invention employing a craft 81 comprised of a wing structure 82. In this embodiment three turbines 84 are mounted on top of the wing structure 82. In this embodiment there are provided three primary tethers 85, 86 and 87 that extend from the ground station 88 to the craft 81. FIG. 14 also illustrates the tethers as one fore tether 85 with an attachment point to the craft and two aft tether 86, 87 each with an attachment point to the craft at a more aft location. The aft tether attachments are on respective left and right attachment points of the craft in a similar manner to that illustrated in FIG. 11. In this embodiment there are essentially no side walls and the wing structure is essentially open. The wing can illustratively incorporate a dihedral angle, which improves roll stability. Three wind turbines 84 are shown mounted on top of the wing structure 82. Also of note in this embodiment is the addition of a tail structure 83 with vertical and horizontal stabilizers. It should be clear that the number of turbines provided to such an embodiment can be widely varied based upon the size of individual turbines employed and the carrying volume/form-factor of the craft.

Likewise, it is appreciated and expressly contemplated that the dimensions and other geometries/measurements, such as airfoil sectional thicknesses, chord/radius ratio, and others provided as illustrative examples of the above-disclosed embodiment of the airborne variant of the inventive shroud are not necessarily applicable to the underwater embodiment, the dimensions and other measurements of which can be varied according to specific applications.

It should be clear that the various embodiments of an LTA craft and/or LTA shroud provide highly desirable platforms for mounting one or more wind-energy converters (e.g. turbines). These shapes allow for neutral or positive aerodynamic lift, via their aerodynamic geometry for greater stability and overall lift capability. Likewise, these craft effectively locate the wind converters at an elevation where they can operate most effectively, while allowing relatively quick retrieval for service or to avoid severe weather conditions.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the buoyant fluid used to inflate the LTA shroud/craft is highly variable, and can include conventional helium, hydrogen mixtures of helium and hydrogen, hot air or another heated gas, or any other fluid that provides buoyancy in relation to the surrounding fluid environment. Likewise, while various embodiments show single or multiple tethers on the fore or aft position of the craft, it is expressly contemplated that the number and placement of tethers and/or bridles is highly variable. Thus, while various embodiments describe multiple tethers on the fore section at discrete/different locations, and a single tether at the aft section, in alternate embodiments, a single tether can be located on a fore section and a plurality of tethers can be located at discrete/different locations on the aft section. Also additional or alternative tethers can be provided at other locations along the craft or connected to certain structures, such as wings or winglets. Accordingly, this description is meant to be taken only by way of example, and not to otherwise limit the scope of this invention.

What is claimed is:
1. A wind-based power generating system comprising:
 a wind energy converter for converting wind energy into another form of energy;
 a lighter-than-air craft configured to produce at least one of neutral net lift and positive net lift to the wind energy converter, the net lift including a net aerodynamic lift and a net buoyant lift; and
 a tethering system configured to restrain the lighter-than-air craft with respect to the ground, wherein the lighter-than-air craft defines an interior volume for containing a lighter-than-air gas, and wherein the lighter-than-air craft has a fore section and an aft section, wherein the tethering system has at least one attachment point on the fore section of the lighter-than-air craft and at least one attachment point on the aft section of the lighter-than-air craft, wherein the craft includes opposite end semi-circular structures and a substantially straight middle structure that inter-connects the opposite end semi-circular structures, thereby resulting in non-circular overall shape.

2. The wind-based power generating system of claim 1 wherein the lighter-than-air craft includes asymmetric top and bottom portions and has a cross-sectional shape at least in part configured as a lifting airfoil.

3. The wind-based power generating system of claim 2 wherein the lifting airfoil section is configured to have an angle of attack relative to the prevailing wind so as to produce an aerodynamic lift vector oriented substantially upwardly.

4. The wind-based power generating system of claim 3 wherein the craft includes aerodynamic structures constructed and arranged to, at least one of, stabilize and control the shroud in the wind.

5. The wind-based power generating system of claim 4 wherein the aerodynamic structures comprise any one or more of wings, winglets, fins, vertical stabilizers, horizontal stabilizers, tails, streamers attached to the craft.

6. The wind-based power generating system of claim 5 wherein the wings or winglets are configured to provide additional lift.

7. The wind-based power generating system of claim 1, wherein the craft has a center of buoyancy and a center of gravity, wherein the center of buoyancy and the center of gravity are both located between the at least one attachment point in the fore section and the at least one attachment point in the aft section of the shroud.

8. The wind-based power generating system of claim 1 wherein the system controls a pitch of the craft by a means for actively shortening and lengthening at least one of the aft tether and fore tether.

9. The wind-based power generating system of claim 1 wherein at least one tether directly connects a base station to a fore location of the craft, and at least another tether directly connects the base station to an aft location of the craft.

10. The wind-based power generating system of claim 9 including two separate tethers connected from the base station to respective spaced apart locations on at least one of the fore location of the craft and the aft location of the craft.

11. The wind-based power generating system of claim 1 wherein at least one tether directly connects a base station to at least one of either a fore location of the craft and an aft location on the craft, and a bridled tether respectively connects the base station to at least one of a spaced apart aft location of the craft and a spaced apart fore location of the craft.

12. The wind-based power generating system of claim 11 wherein the bridled tether has a juncture point for changing the length of bridle lines that connect to the craft.

13. The wind-based power generating system of claim 1 wherein at least one tether directly connects a base station to a fore location of the craft, and further including a bridle connection from the tether that has at least one bridle line connected from a juncture to a fore location of the craft, and at least to at least one other bridle line connected from a juncture to an aft location of the craft.

14. The wind-based power generating system of claim 1 including at least one fin disposed at a top location of the craft.

15. The wind-based power generating system of claim 14 including at least one winglet supported to and extending from each of opposing sides of the craft.

16. The wind-based power generating system of claim 15 including a pair of fins attached at spaced locations on the top of the craft and a pair of winglets extending from each of opposing sides of the craft.

17. The wind-based power generating system of claim 1 wherein the craft comprises a single airfoil.

18. The wind-based power generating system of claim 1 wherein the wind energy converter includes a plurality of wind turbines.

19. The wind-based power generating system of claim 1 further comprising a tail structure attached to an aft location of the craft.

20. The wind-based power generating system of claim 1 wherein the lighter-than air craft defines a construction including upper and lower airfoils having at least one wind turbine therebetween.

21. A wind-based power generating system comprising:
a wind energy converter for converting wind energy into another form of energy;
a lighter-than-air craft configured to produce at least one of neutral net lift and positive net lift to the wind energy converter, the net lift including a net aerodynamic lift and a net buoyant lift; and
a tethering system configured to restrain the lighter-than-air craft with respect to the ground, wherein the lighter-than-air craft defines an interior volume for containing a lighter-than-air gas, and wherein the lighter-than-air craft has a fore section and an aft section, wherein the tethering system has at least one attachment point on the fore section of the lighter-than-air craft and at least one attachment point on the aft section of the lighter-than-air craft, wherein at least one tether directly connects a base station to at least one of either a fore location of the craft and an aft location on the craft, and a bridled tether respectively connects the base station to at least one of a spaced apart aft location of the craft and a spaced apart fore location of the craft, and wherein the bridled tether has a juncture point for changing the length of bridle lines that connect to the craft.

22. A wind-based power generating system comprising:
a wind energy converter for converting wind energy into another form of energy;
a lighter-than-air craft configured to produce at least one of neutral net lift and positive net lift to the wind energy converter, the net lift including a net aerodynamic lift and a net buoyant lift; and
a tethering system configured to restrain the lighter-than-air craft with respect to the ground, wherein the lighter-than-air craft defines an interior volume for containing a lighter-than-air gas, and wherein the lighter-than-air craft has a fore section and an aft section, wherein the tethering system has at least one attachment point on the fore section of the lighter-than-air craft and at least one attachment point on the aft section of the lighter-than-air craft, wherein the lighter-than air craft defines a construction including upper and lower airfoils having at least one wind turbine therebetween.

* * * * *